United States Patent Office 2,761,269
Patented Sept. 4, 1956

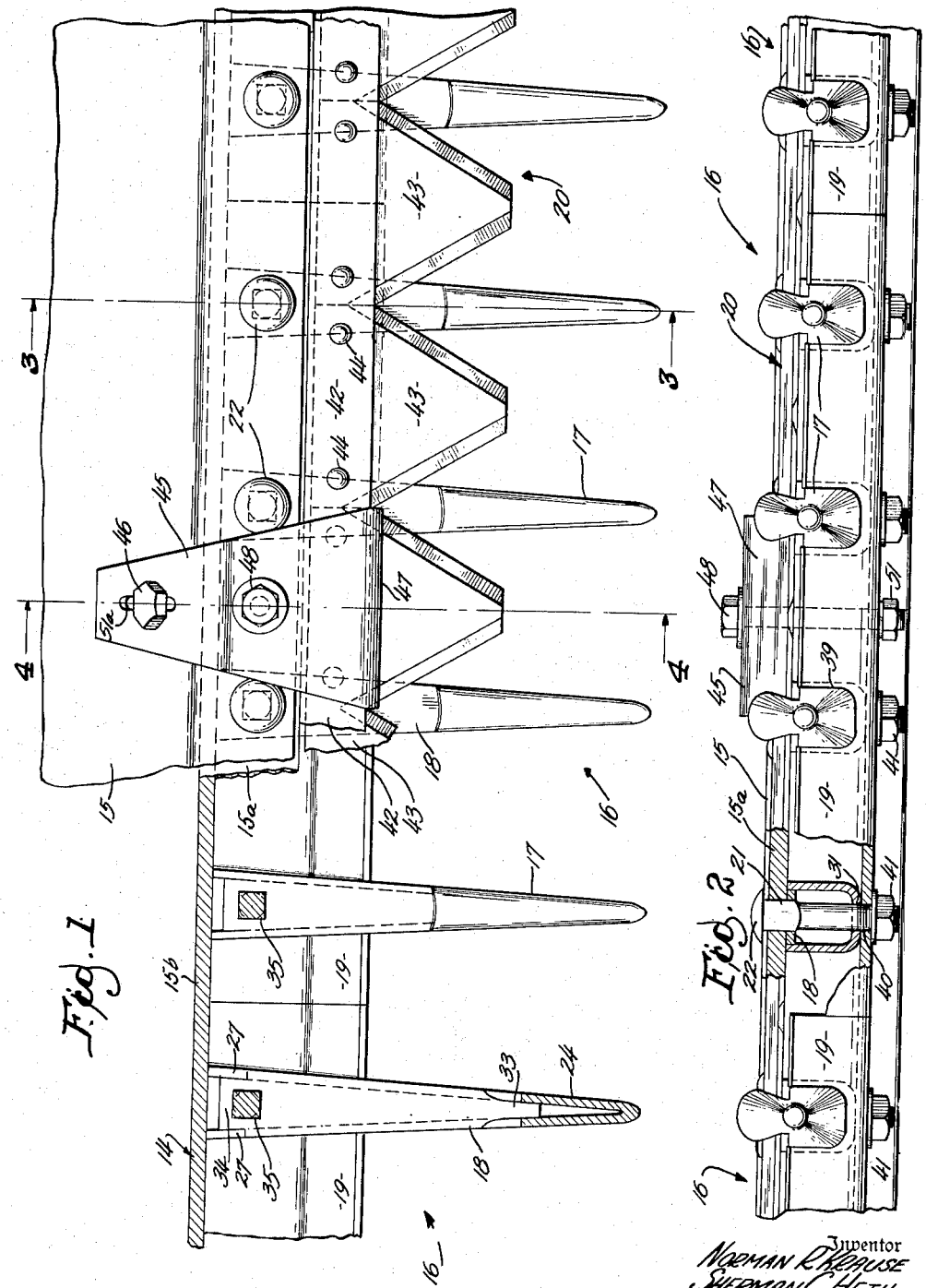

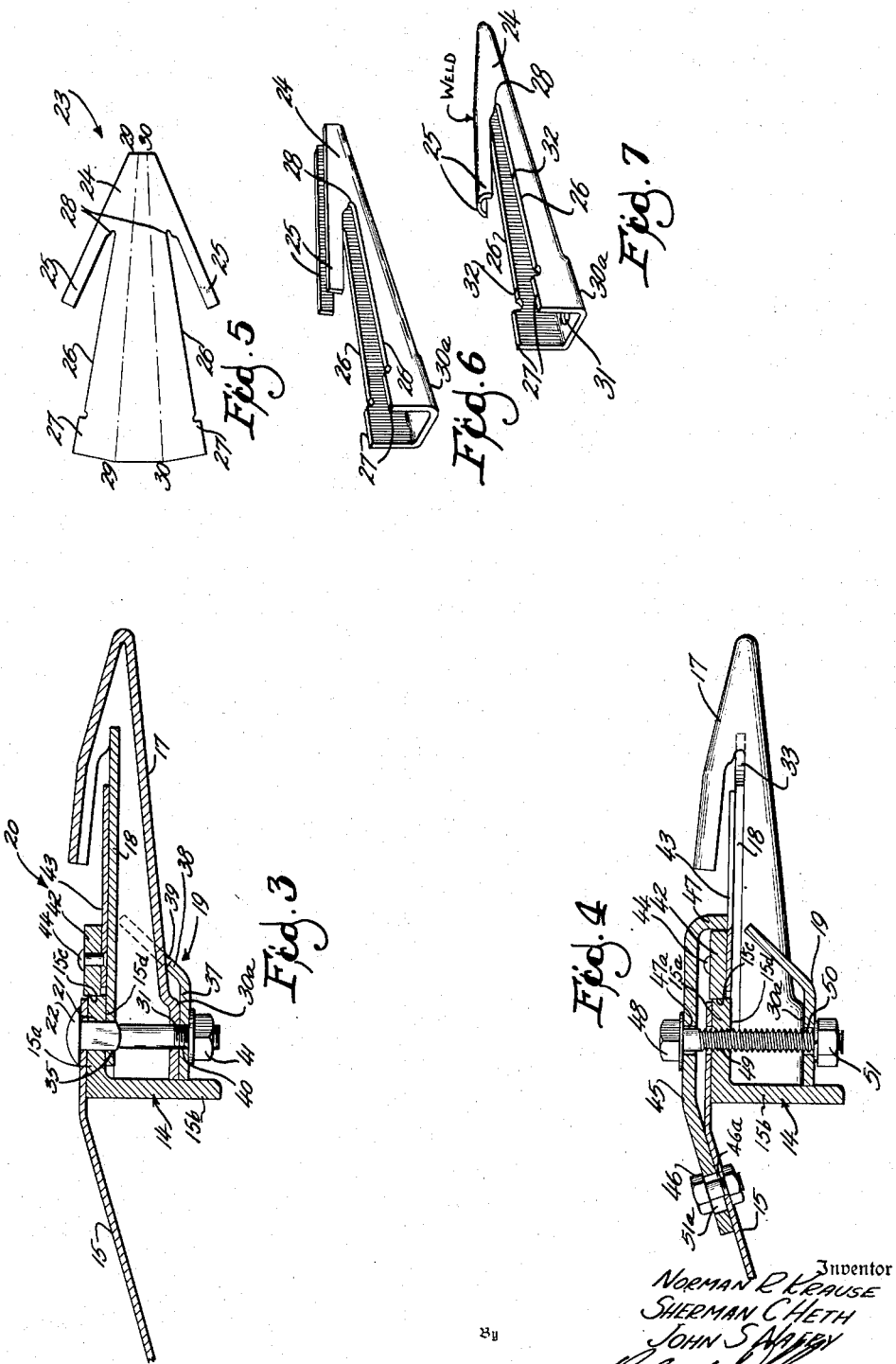

2,761,269

SICKLE BAR CONSTRUCTION

Norman R. Krause, Sherman C. Heth, and John S. Naery, Racine, Wis., assignors to J. I. Case Company, Racine, Wis., a corporation of Wisconsin Continuation of application Serial No. 231,982, June 16, 1951. This application November 26, 1954, Serial No. 471,157

10 Claims. (Cl. 56—298)

The present invention relates to a sickle bar construction and one of the objects thereof is to simplify this construction and to eliminate parts where possible.

A further object is to provide a sickle bar construction comprising a plurality of gangs which can be independently disassembled without impairing the operating efficiency of the remaining gangs.

Another object of the invention is to provide an improved sickle bar construction embodying elements so correlated, shaped, and arranged as to effect greater strength, rigidity, and ease of attachment and removal than obtained in prior sickle bar constructions.

Further objects and advantages of the invention will be apparent from the following description and drawings wherein:

Fig. 1 is a plan view of a sickle bar construction embodying the present invention, with parts broken away.

Fig. 2 is a front view of the sickle bar construction shown in Fig. 1, with parts broken away and shown in section.

Fig. 3 is a sectional view taken on the line 3—3 of Fig. 1.

Fig. 4 is a sectional view taken on the line 4—4 of Fig. 1.

Fig. 5 is a plan view of a sheet metal blank which is to be formed into a sickle guard.

Fig. 6 is a right-rear perspective view of the blank after the first forming operation.

Fig. 7 is a right-rear perspective view of the structure shown in Fig. 6 after the final forming operation.

This application is a continuation of application S. N. 231,982, filed June 16, 1951, and now abandoned, the process for manufacturing a pressed sheet metal guard disclosed but not claimed herein being claimed in an application filed on even date herewith.

Referring to the drawings, the construction embodying the present invention includes a guard bar generally designated as 14 adapted to be secured to a supporting traveling framework, a portion of which is shown at 15, such as that in a harvester of any conventional or suitable construction said guard bar comprising a forwardly extending portion 15a and a downwardly extending portion 15b, portion 15a having a substantially smooth front edge 15c and an undersurface 15d. Secured to and protruding forwardly from the guard bar 14 are a plurality of gangs 16 each of which comprises a plurality of sickle guards 17, in the present instance four, ledger plates 18, and a stabilizing plate 19. A sickle generally designated as 20 is provided for cooperating with the cutting edges of the ledger plates as will appear hereinafter.

Bolt accommodating holes 21 are formed equidistant from one another along the portion 15a for reception of carriage bolts or other suitable fastening means 22 for fastening the gangs 16 to the guard bar 14.

The guards 17 are preferably formed from pressed steel or similar material, however, it will be understood that the sickle guard construction of the present invention is adapted to the use of cast malleable iron guards or forged guards as well as the pressed steel guards which are illustrated in the drawings.

In the manufacture of the pressed guards of the present invention an arrow-shaped configuration or blank 23 is stamped by means of a suitable stamping or other type machine from sheet metal, preferably steel, see Fig. 5. This blank is formed with a head portion 24 having rearwardly diverging wings or canopies 25, rearwardly diverging straight edge portions 26 having lateral extensions 27 adjacent the rearward ends thereof, and forwardly extending slots 28 which form the juncture of the straight edge portions 26 with the diverging wings 25. The blank is placed in an automatic pressing or other suitable machine and acted upon by a suitable die which bends the blank along the lines 29—29 and 30—30 so that the blank laterally of the lines 29—29 and 30—30 extends upwardly in a substantially vertical direction so as to form sides which are substantially symmetrical as to size and shape, see Fig. 6. Simultaneously the die presses that portion of the blank adjacent its rear end and between lines 29—29 and 30—30 sufficiently downwardly to form a seating portion 30a which is substantially parallel to the upper surface of the straight edge portions 26. The head portion 24 and the wings 25 are then acted upon by another die which presses the head portion and the wings inwardly so that they join along the medial plane of the guard, see Fig. 7. The wings and head portion are then secured together along their line of juncture by means of welding or any other suitable mechanical means and an opening 31 is punched or drilled medially in the seating portion 30a for accommodating the bolts 22 as will be more fully explained hereinafter. It will be appreciated that the above method of manufacture entails relatively few steps and produces a pressed steel guard which is a finished product as far as additional machining is concerned, the lateral surface of the straight edge portions 26 being substantially coplanar and serving as ledger plate supporting shoulders 32. It will also be appreciated that the substantially trough-like forwardly converging shape of the guard possesses great strength while being capable of being manufactured in great numbers in a relatively short time.

The ledger plates 18 are shaped so as to fit snugly on the ledger plate supporting shoulders 32 and are formed with a forwardly extending lip 33 adjacent the forward end thereof and a shaped-portion 34 adjacent the rearward end thereof. The ledger plates are fixed forwardly upon the shoulders 32 by wedging the lip 33 between the inner surfaces of the head portion 24 forwardly of the slots 28, and the lip 33 is so portioned as to have a tight fit when forced therein for preventing lateral deflection of the ledger plate due to the reciprocating action of the sickle. The shaped portion 34 is so shaped as to fit between the extensions 27 when the ledger plate is wedged forwardly into the guard, the extensions 27 aiding in preventing deflection of the guard due to the reciprocating action of the sickle. The upper surfaces of the extensions are substantially co-planar with the upper surface of the ledger plate when the ledger plate is positioned on the shoulders 32 for presenting a continuous surface for attachment to the guard bar 14 as will be appreciated more fully hereinafter. An opening 35 is formed adjacent the rearward end of each of the ledger plates 18 for reception of the bolts 22 as will be explained shortly.

Each gang 16 has a stabilizing plate 19, which in the present instance is substantially angular-shaped in cross section and comprises a rearwardly extending portion 37 and an upwardly and forwardly extending portion 38. A plurality of saddles or cut-out portions 39 are formed in the portion 38 and are so positioned as to cradle or embrace the sides of the guards 17. The portion 37 seats against the seating portions 30a of guards 17 and has formed therein a plurality of openings 40 for reception of the bolts 22, and a nut 41 is threaded on the respective end of each of the bolts 22 for drawing the stabilizing plate 19 and the respective guards 17 and ledger plates 18 against the undersurface 15b of the portion 15a of guard bar 14, the stabilizing plate 19 maintaining the guards 17 in their proper position with respect to the guard bar. Each stabilizing plate 19 accommodates four guards in the present instance and a stabilizing plate together with its respective guards 17 and ledger plates 18 constitutes a gang 16 hereinbefore stated. The stabilizing plate of one gang abuts the stabilizing plates of its adjacent gangs and the stabilizing plates are so proportioned that the guards 17 extend forwardly from the guard bar 14 in equally spaced substantially parallel relationship when the gangs are secured thereto. It will be appreciated that an individual gang 16 can be disassembled from the guard bar 14 without impairing the operating efficiency of the remaining gangs. This is accomplished by removing the nuts 41 from the proper bolts 22 and allowing the respective stabilizing plate 19, its guards 17 and ledger plates 18 to drop downward out of engagement with the respective bolts 22.

The sickle 20 comprises a sickle bar 42 which has secured to the undersurface thereof a plurality of triangular sickle blades or sections 43, the sickle blades 43 forming the sliding surface of the sickle 20. The blades are secured to the undersurface of the bar 42 by means of rivets or other suitable fastening means 44 so that the sickle blades can be easily replaced by removing the necessary rivets. It will be appreciated that greater continuity of surface is achieved between the sickle blades 43 and the ledger plates 18 by reciprocating the entire undersurface of the blades upon the ledger plates, increasing thereby the cooperation between the respective cutting edges while decreasing the tendency of the sickle sections to tilt upon the ledger plates. Also, the guard can be a simple straight member which does not need an offset, groove, or notch to clear bar 42 as would be necessary if the bar 42 were beneath the blades 43, as is common in prior construction.

A pressure clip 45, preferably formed of spring steel or other suitable material, is provided for each gang 16 for holding the sickle blades 43 in frictional engagement with the ledger plates 18 besides providing in cooperation with the front edge 15c of portion 15a of guard bar 14 a transverse guideway for sickle bar 42. Each clip 45 is secured rearwardly to the portion 15 of the traveling framework by means of a suitable bolt or the like 46 and extends forwardly between two adjacent guards 17, the bolt 46 being received in an opening 46a formed in portion 15. A downwardly extending portion 47 is formed adjacent the forward end of each clip 45 and a slightly elongated opening 47a is formed medially in the clip for reception of a hold-down bolt 48. The hold-down bolt 48 is threaded into a threaded opening 49 formed in the portion 15a of the guard bar 14 to move the portion 47 sufficiently close to the sickle blades 43 to maintain the sickle blades in frictional contact with the ledger plates 18. The hold-down bolt 48 is of a length sufficient to extend through an opening 50 formed in the stabilizing plate 19 when the portion 48 is at its desired position and a lock nut 51 is threaded on the end thereof for locking the bolt 48 against unintended turning in the threaded opening 49. If the operator wishes to adjust the pressure exerted by the clip 45 against the sickle blades 43, he must first loosen nut 51 sufficiently to allow hold-down bolt 48 to be threaded into or out of threaded opening 49. When the proper adjustment for clip 45 is reached, lock nut 51 is again drawn against the stabilizing plate 19, locking thereby the hold-down nut against turning in the threaded opening 49. The bolt 46 is accommodated in a slot 51a formed in the portion 15 of the traveling framework and opening 47a is formed sufficiently large to provide for backward or forward adjustment of the pressure clip for adjusting the clearance of the sickle bar between the guard bar and the clip. It will be appreciated that while the invention is shown with a pressure clip associated with each gang 16, the position of these clips or the number employed is discretionary and of importance merely with regard to the mechanical details of construction and does not concern the gist of the invention. It will be further appreciated that in disassembling an individual gang 16 from the guard bar 14 in a manner as previously described, the lock nut 51 must first be threaded off the end of the bolt 48 before the stabilizing plate 19 is free to drop from the guard bar 14 when the nuts 41 are threaded off the end of the bolts 22.

The operation of the device is thought to be clear from the following description, it being apparent that the sickle 20 rests upon the upper surfaces of the ledger plates 18. It will be apparent from Fig. 1 and as is common in devices of this character, the shearing of the crop material between the sections 43 and the ledger plates 18 results in a backward reaction against the sickle as a whole tending to press it rather forceably against smooth front edge 15c of the guard bar 14. The guards 17 are effectively prevented from oscillating as a result of the movements of sickle 20 by engagement of stabilizing plates 19 and, if necessary, clips 45 may be readily adjusted as to downward pressure by means of bolts 48 and as to fore and aft location by loosening the clamping bolts 46.

Having thus described our invention, what we claim and desire to secure by Letters Patent is:

1. In a sickle bar construction, the combination of a guard supporting bar, said guard supporting bar being substantially angular shaped in cross-section and including a forwardly extending portion and a downwardly extending portion, said forwardly extending portion having a substantially smooth front edge, a guard in fixed relation to the under surface of said forwardly extending portion of the guard bar and having a substantially flat continuous ledger plate thereon extending rearwardly at least to said front edge, a plurality of sickle sections slidable on said ledger plate, a sickle bar above said sections and fastened thereto for guiding and sliding said sickle sections on said ledger plate and constituting therewith a sickle, said sickle reacting backwardly against said smooth front edge, a support secured to the upper surface of the forwardly extending portion of said guard bar and extending rearwardly therefrom, a clip positioned above the forwardly extending portion of said guard bar and bent down in front of said sickle bar, fastening means for securing said clip to said support rearwardly of said guard bar, and means for holding and adjusting the clip against said sickle sections with varying degrees of pressure including a hold-down bolt received by said clip above said guard bar and extending downwardly therefrom and adjustably fixed to the forwardly extending portion of said guard bar.

2. In a sickle bar construction, the combination of a guard supporting bar, said guard supporting bar being substantially angular shaped in cross section and including a forwardly extending portion and a downwardly extending portion, said forwardly extending portion having a substantially smooth front edge, a guard in fixed relation to the under surface of said forwardly extending portion of the guard bar and having a substantially flat continuous ledger plate thereon extending rearwardly at least to said front edge, a plurality of sickle sections slidable on said ledger plate, a sickle bar above said sickle sections and fastened thereto for guiding and sliding said sickle sections on said ledger plate and constituting therewith a sickle, said sickle reacting backwardly against said smooth front edge, a support secured to the upper surface of the forwardly extending portion of said guard bar and extending rearwardly therefrom, said support having an opening formed therein, a clip positioned above the forwardly extending portion of said guard bar and bent down in front of said sickle bar, said clip having formed therein a first longitudinally extending opening in alignment with said opening formed in said support and a second longitudinally extending opening in alignment with said forwardly extending portion of said guard bar, a hold-down bolt received in said second longitudinally extending opening and extending downwardly therefrom and adjustably fixed to said forwardly extending portion for holding and adjusting said clip against said sickle sections with varying degrees of pressure, and a fastening means received in said first longitudinally extending opening and in said opening formed in said support for securing said clip to said support in various longitudinal positions with respect to said sickle bar for adjusting the clearance of said sickle bar between said smooth front edge of said guard bar and said clip.

3. In a sickle bar construction, the combination of a guard supporting bar, said guard supporting bar being substantially angular shaped in cross-section and including a forwardly extending portion and a downwardly extending portion, said forwardly extending portion having a substantially smooth front edge, a guard in fixed relation to the under surface of said forwardly extending portion of the guard bar and having a substantially flat continuous ledger plate thereon extending rearwardly at least to said front edge, a plurality of sickle sections slidable on said ledger plate, a sickle bar above said sickle sections and fastened thereto for guiding and sliding said sickle sections on said ledger plate and constituting therewith a sickle, said sickle reacting backwardly against said smooth front edge, a support secured to the upper surface of the forwardly extending portion of said guard bar and extending rearwardly therefrom, a clip positioned above the forwardly extending portion of said guard bar and bent down in front of said sickle bar, fastening means for securing said clip to said support rearwardly of said guard bar, a hold-down bolt received by said clip above said guard bar and extending downwardly therefrom and threadedly received in the forwardly extending portion of said guard bar for moving said clip against said sickle sections with varying degrees of pressure, a stabilizing plate operatively associated with said guard when positioned against the under surface thereof and adjacent the rearward end thereof for holding said guard in predetermined angled position relative to said supporting bar, said stabilizing plate having an opening formed therein and said bolt protruding downwardly through said opening formed in said stabilizing plate, and a nut threadedly received by said bolt for drawing said stabilizing plate tightly against said guard independently of the pressure exerted by said clip against said sickle sections.

4. In a sickle bar construction, the combination of a guard supporting bar, said guard supporting bar being substantially angular shaped in cross-section and including a forwardly extending portion and a downwardly extending portion, said forwardly extending portion having a threaded opening formed therein and a substantially smooth front edge, a guard in fixed relation to the under surface of said forwardly extending portion of the guard bar and having a substantially flat continuous ledger plate thereon extending rearwardly at least to said front edge, a plurality of sickle sections slidable on said ledger plate, a sickle bar above said sickle sections and fastened thereto for guiding and sliding said sickle sections on said ledger plate and constituting therewith a sickle, said sickle reacting backwardly against said smooth front edge, a support secured to the upper surface of the forwardly extending portion of said guard bar and extending rearwardly therefrom, said support having an opening formed therein, a clip positioned above the forwardly extending portion of said guard bar and bent down in front of said sickle bar, said clip having formed therein a longitudinally extending opening in alignment with said opening formed in said support and a longitudinally extending opening in alignment with the threaded opening formed in said forwardly extending portion of said guard bar, a hold-down bolt received in the second-mentioned longitudinally extending opening and extending downwardly therefrom and threadedly received in said threaded opening formed in said forwardly extending portion for moving said clip against said sickle sections with varying degrees of pressure, a stabilizing plate operatively associated with said guard when positioned against the under surface thereof and adjacent the rearward end thereof for holding said guard in predetermined angled position relative to said supporting bar, said stabilizing plate having an opening formed therein and said hold-down bolt protruding downwardly through said opening formed in said stabilizing plate, a nut threadedly received on said hold-down bolt for drawing said stabilizing plate tightly against said guard independently of the pressure exerted by said clip against said sickle sections, and a fastening means received in the first-mentioned longitudinally extending opening and the opening formed in the support for securing said clip to said support in various longitudinal positions with respect to said sickle bar for adjusting the clearance of said sickle bar between said smooth front edge of said guard bar and said clip.

5. A sickle bar construction comprising a guard bar, a guard having an enclosed forwardly converging head portion and a rearwardly diverging trough-like portion, said head portion including a rearwardly extending protective canopy and said trough-like portion having substantially straight ledger plate supporting shoulders extending rearwardly from said head portion to substantially the end of said guard, a ledger plate supported on said ledger plate supporting shoulders and extending rearwardly to substantially the end of the guard upon the shoulders, the forward end of said ledger plate being located and retained in said head portion in predetermined position for locating said ledger plate on said shoulders, a stabilizing plate for preventing side to side deflection of said guard with respect to said guard bar, said stabilizing plate being substantially angular shaped in cross section and including a rearwardly extending portion and an upwardly and forwardly extending portion, said upwardly and forwardly extending portion having formed therein a saddle for snugly receiving the trough-like portion of said guard, and a bolt protruding from said guard bar and received by said ledger plate, said guard, and the rearwardly extending portion of said stabilizing plate for securing said ledger plate, said guard, and said stabilizing plate to said guard bar.

6. A sickle bar construction comprising a substantially angular shaped guard bar, a guard having an enclosed forwardly converging head portion and a rearwardly diverging trough-like portion, said head portion including a rearwardly extending protective canopy and said trough-like portion having substantially straight ledger plate supporting shoulders extending rearwardly from said head portion to substantially the end of said guard, a ledger plate supported on said ledger plate supporting shoulders and extending rearwardly on said shoulders to substantially the end of said guard, the forward end of said ledger plate having formed thereon a lip which is located and retained in said head portion for locating the forward end of said ledger plate on said shoulders, a stabilizing plate substantially angular shaped in cross-section and including an upwardly and forwardly extending portion and a rearwardly extending portion, said upwardly and forwardly extending portion having formed therein a saddle for snugly receiving therein the trough-like portion of said guard for preventing side to side deflection thereof with respect to said guard bar, and a bolt extending from said guard bar and received by said ledger plate, said guard, and the rearwardly extending portion of said stabilizing plate for securing said ledger plate, said guard, and said stabilizing plate to said guard bar.

7. A sickle bar construction comprising a guard bar, a pressed sheet metal guard having an enclosed forwardly converging head portion and a rearwardly diverging trough-like portion, said head portion including a rearwardly extending protective canopy and said trough-like portion having substantially straight ledger plate supporting shoulders extending rearwardly from said head portion to substantially the rearward end of said guard, said shoulders having formed thereon upward extensions adjacent the rearward ends thereof, a ledger plate supported on said ledger plate supporting shoulders, said ledger plate having a lip formed adjacent the forward end thereof which is located and retained in said head portion and a shaped portion adjacent the rearward end thereof which is accommodated by said extensions, the upper surface of said extensions being substantially coplanar with the upper surface of said ledger plate when said ledger plate is supported on said ledger plate supporting shoulders, said ledger plate extending to substantially the rearward end of said guard, a stabilizing plate for preventing lateral deflection of said guard with respect to said guard bar, said stabilizing plate being substantially angular shaped in cross section and including an upwardly and forwardly extending portion having formed therein a saddle for snugly receiving therein said guard and a rearwardly extending portion, and a bolt extending from said guard bar and received by said ledger plate, said guard, and the rearwardly extending portion of said stabilizing plate for securing said ledger plate, said guard, and said stabilizing plate to said guard bar.

8. A sickle bar construction comprising a guard bar, a plurality of gangs, each of said gangs including a plurality of spaced-apart forwardly converging pressed sheet metal guards, each of said guards having a substantially trough-like portion and an enclosed head portion, said trough-like portion including rearwardly extending substantially straight ledger plate supporting shoulders and said enclosed head portion having a protective canopy extending rearwardly over said ledger plate supporting shoulders, a ledger plate carried on the ledger plate supporting shoulders of each of said guards, each of said ledger plates having a forwardly extending lip located and retained in the head portion of each of said guards adjacent the juncture of said ledger plate supporting shoulders with said head portion, a stabilizing plate for positioning said guards in equally spaced parallel relationship, said stabilizing plate being substantially angular shaped in cross-section and including an upwardly and forwardly extending portion having formed therein saddles for snugly receiving therein said guards and a rearwardly extending portion, said guard bar, each of said ledger plates, each of said guards, and the rearwardly extending portion of said stabilizing plate having formed therein openings positioned to be brought into registry when each of said gangs is properly positioned with respect to said guard bar, a guard bolt for insertion in each of said registered openings for holding said stabilizing plate, said guards, and said ledger plates to said guard bar.

9. A sickle bar construction comprising a guard bar, a plurality of gangs, each of said gangs including spaced-apart forwardly extending sickle guards, each of the guards having a substantially trough-like portion and an enclosed head portion, said trough-like portion including rearwardly extending substantially straight ledger plate supporting shoulders extending substantially to the rearward end of each of said guards and extensions formed adjacent the rearward end of each of said supporting shoulders, and said enclosed head portion having a protective canopy extending rearwardly over said ledger plate supporting shoulders, a ledger plate associated with each of said sickle guards and supported on said supporting shoulders, each of said ledger plates having a forwardly extending lip located and retained in the head portion of each of said guards and a shaped portion adjacent the rearward end thereof for accommodating the extensions, the upper surface of said extensions being substantially coplanar with the upper surface of said ledger plate, and a stabilizing plate for positioning said guards in equally spaced parallel relationship, said stabilizing plate being substantially angular shaped in cross-section and including an upwardly and forwardly extending portion which has formed therein suitable saddles for snugly receiving therein said guards and a rearwardly extending portion, said guard bar, said ledger plates, said guards, and the rearwardly extending portion of said stabilizing plate having formed therein openings positioned to be brought into registry when said gang is properly positioned with respect to said guard bar, and a guard bolt received in said registered openings for holding said stabilizing plate, said guard, and said ledger plates to said guard bar.

10. In a sickle bar construction, the combination of a guard supporting bar having a forwardly extending portion, a plurality of guard assemblies for disposition against the under surface of said forwardly extending portion, each of said guard assemblies comprising a guard having an enclosed forwardly-converging head portion and a rearwardly-diverging trough-like portion, said head portion including a rearwardly extending protective canopy and said trough-like portion having substantially straight ledger plate supporting shoulders extending rearwardly to substantially the end of said guard, and a ledger plate supported on said ledger plate supporting shoulders and extending rearwardly on said shoulders to substantially the end of said guard, the forward end of said ledger plate being located and retained in said head portion for locating said ledger plate on said guard, a plurality of bolts extending from said supporting bar and received by said ledger plate and said guard of each of said guard assemblies for securing said guard assemblies in predetermined spaced relationship firmly against the underside of said forwardly extending portion, and a stabilizing plate secured by said bolts and operatively associated with each of said guards at a point forwardly disposed with respect to said bolts for holding said guard assemblies in uniform parallel relationship relative to said supporting bar.

References Cited in the file of this patent

UNITED STATES PATENTS

| | | |
|---|---|---|
| 2,278,393 | Vutz | Mar. 31, 1942 |
| 2,431,509 | Ronfeldt | Nov. 25, 1947 |
| 2,431,663 | Scranton | Nov. 25, 1947 |

FOREIGN PATENTS

| | | |
|---|---|---|
| 561,284 | France | Oct. 19, 1923 |
| 275,263 | Germany | July 20, 1927 |
| 448,220 | Germany | Aug. 10, 1927 |